(12) United States Patent
Yu et al.

(10) Patent No.: US 12,208,573 B2
(45) Date of Patent: Jan. 28, 2025

(54) DEPOWDERING OF ADDITIVELY MANUFACTURED OBJECTS WITH SMALL AND/OR COMPLEX INTERNAL GEOMETRIES

(71) Applicant: UCHICAGO ARGONNE, LLC, Chicago, IL (US)

(72) Inventors: Wenhua Yu, Darien, IL (US); Dileep Singh, Naperville, IL (US); David M. France, Lombard, IL (US); Wenchao Du, Willowbrook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 219 days.

(21) Appl. No.: 17/107,726

(22) Filed: Nov. 30, 2020

(65) Prior Publication Data
US 2022/0168950 A1    Jun. 2, 2022

(51) Int. Cl.
*B29C 64/165* (2017.01)
*B08B 5/02* (2006.01)
(Continued)

(52) U.S. Cl.
CPC .......... *B29C 64/165* (2017.08); *B29C 64/245* (2017.08); *B29C 64/35* (2017.08);
(Continued)

(58) Field of Classification Search
CPC .. B08B 7/02; B08B 5/02; B29C 64/35; B29C 64/165; B22F 2003/247; B22F 10/68
See application file for complete search history.

(56) References Cited

U.S. PATENT DOCUMENTS 5,054,155 A * 10/1991 McKibben ........... B22D 29/006
15/304
6,917,326 B1 * 7/2005 Tregenza ................. B08B 7/02
342/118
(Continued)

FOREIGN PATENT DOCUMENTS

CN        203437369 U  *  2/2014

OTHER PUBLICATIONS

CN203437369U_Machine Translation provided herewith (Year: 2014).*

*Primary Examiner* — Yunju Kim
(74) *Attorney, Agent, or Firm* — MARSHALL, GERSTEIN & BORUN LLP (57) ABSTRACT

A method of depowdering objects (e.g., heat exchangers) having small and/or complex internal geometries and manufactured using an additive manufacturing technique performed with a powder material. The method includes applying a pressurized fluid to the objects via a pressurized fluid applicator operatively coupled to the object, thereby removing a portion of unbound powder material on or in the object. The method further includes applying vortex vibration to the object via a vortex vibration source operatively coupled to the object, thereby loosening a portion of the unbound powder material remaining on or in the object, and applying the pressurized fluid to the object via the pressurized fluid application, thereby removing a portion of the loosened, unbound powder material from the object. The latter two applying steps are repeated until a specified amount of the unbound powder material has been removed from the object.

21 Claims, 3 Drawing Sheets

(51) Int. Cl.
*B08B 7/02* (2006.01)
*B29C 64/245* (2017.01)
*B29C 64/35* (2017.01)
*B33Y 10/00* (2015.01)
*B33Y 40/20* (2020.01)
*B33Y 80/00* (2015.01)
B29L 31/18 (2006.01)

(52) U.S. Cl.
CPC . *B08B 5/02* (2013.01); *B08B 7/02* (2013.01); *B29L 2031/18* (2013.01); *B33Y 10/00* (2014.12); *B33Y 40/20* (2020.01); *B33Y 80/00* (2014.12)

(56) References Cited

U.S. PATENT DOCUMENTS

| | | |
|---|---|---|
| 10,189,057 B2 | 1/2019 | Craft et al. |
| 2003/0015227 A1* | 1/2003 | Takayama ................. B08B 7/02 134/184 |
| 2017/0074205 A1* | 3/2017 | Maki ................... B22D 19/0009 |
| 2018/0283795 A1* | 10/2018 | Cerny ....................... F28F 1/12 |
| 2018/0304360 A1 | 10/2018 | Fontana et al. |
| 2018/0326484 A1 | 11/2018 | Bonilla Gonzalez et al. |
| 2020/0069123 A1* | 3/2020 | Ohtsu ....................... B08B 5/02 |
| 2021/0138660 A1* | 5/2021 | Miyawaki ................ B08B 3/024 |
| 2022/0134667 A1* | 5/2022 | Mansell ................ B29C 64/357 425/78 |
| 2022/0347923 A1* | 11/2022 | Hartmann ............. B33Y 50/00 |
| 2023/0279246 A1* | 9/2023 | Badyal ..................... A01P 1/00 106/287.24 |

* cited by examiner

DEPOWDERING OF ADDITIVELY MANUFACTURED OBJECTS WITH SMALL AND/OR COMPLEX INTERNAL GEOMETRIES

STATEMENT REGARDING FEDERALLY SPONSORED RESEARCH OR DEVELOPMENT

The United States ("U.S.") Government has rights in this invention pursuant to Contract No. DE-AC02-06CH11357 between the U.S. Department of Energy and UChicago Argonne, LLC, representing Argonne National Laboratory.

TECHNICAL FIELD OF THE INVENTION

The present disclosure generally relates to post-processing of additively manufactured objects and, more particularly, to depowdering of additively manufactured objects with small and/or complex internal geometries.

BACKGROUND OF THE INVENTION

Additive manufacturing, also known as 3D printing, generally involves printing an object one layer at a time in accordance with a computer aided design (CAD) model. Additive manufacturing is an increasingly cost-effective and utilized manufacturing method because additive manufacturing enables the manufacture of integrated, functional components in their final dimensions and shapes, thereby reducing or eliminating the need for costly post-printing machining requirements.

One additive manufacturing technique is binder jetting, which generally involves using a roller to spread a layer of powder material, applying a binder agent from jets to the layer, and repeating the process, layer by layer, until the object is formed or printed. The printed object is then subjected to a curing process, which solidifies the binder agent within the layers, a depowdering process, which attempts to remove loose, unbound powder from the object, a debinding process, which decomposes and removes the binder agent, and a sintering process, which forms the final object.

Binder jetting is advantageous because it can be performed without explicit support structures, utilizes less material than other additive manufacturing techniques, and is easily scalable. At the same time, however, binder jetting is disadvantageous because, for example, the process of removing loose, unbound powder material from the printed object can be quite challenging and time-consuming, particularly when the printed object is small, has a complex shape, and/or has a small and/or complex internal geometry that is otherwise difficult or impossible to access, or combinations thereof.

SUMMARY OF THE INVENTION

In accordance with a first aspect, a method is provided for depowdering an object manufactured using an additive manufacturing technique performed with a powder material. The method includes: (a) applying a pressurized fluid to the object via a pressurized fluid applicator operatively coupled to the object, thereby removing a portion of unbound powder material on or in the object; (b) applying vortex vibration to the object via a vortex vibration source operatively coupled to the object, thereby loosening a portion of the unbound powder material remaining on or in the object; (c) applying the pressurized fluid to the object via the pressurized fluid application, thereby removing a portion of the loosened, unbound powder material from the object; and (d) repeating steps (b) and (c) until a specified amount of the unbound powder material has been removed from the object.

In accordance with a second aspect, a method is provided for depowdering an object manufactured using an additive manufacturing technique performed with a powder material. The method includes: (a) removing a portion of unbound powder material from the object by applying a pressurized fluid to the object via the pressurized fluid applicator operatively coupled to the object; (b) loosening a portion of the unbound powder material remaining on or in the object by applying vortex vibration to the object via a vortex vibration source operatively coupled to the object; (c) removing a portion of the loosened, unbound powder material by applying the pressurized fluid to the object via the pressurized fluid applicator; and (d) repeating steps (b) and (c) until a specified amount of the unbound powder material has been removed from the object.

In accordance with a third aspect, a method is provided for additively manufacturing an object. The method includes: (a) forming the object using an additive manufacturing technique performed with a powder material; (b) removing a portion of unbound powder material from the object by applying a pressurized fluid to the object via a pressurized fluid applicator operatively coupled to the object; (c) loosening a portion of the unbound powder material remaining on or in the object by applying vortex vibration to the object via a vortex vibration source operatively coupled to the object; (d) removing a portion of the loosened, unbound powder material by applying the pressurized fluid to the object via the pressurized fluid applicator; and (e) repeating steps (c) and (d) until a specified amount of the powder material has been removed from the object.

In further accordance with any one or more of the foregoing first, second, third, or fourth aspects, a method of depowdering an additively manufactured object or a method of additively manufacturing an object may further include any one or more of the following preferred forms.

In some forms, the specified amount includes substantially all or all of the unbound powder material.

In some forms, the object includes one or more internal passages and step (b) loosens a portion of the unbound powder material in the one or more internal passages.

In some forms, steps (b) and (c) are repeated a number of times based on one or more parameters of the object. In one form, the one or more parameters include one or more of a shape, a size, a surface roughness, an internal geometry, and layers of the object.

In some forms, steps (b) and (c) are repeated at least 25 times.

In some forms, step (b) comprises applying the vortex vibration at a vortex speed for a period of time, wherein the vortex speed and the period of time depend on one or more parameters of the object.

In some forms, step (b) is performed without applying any fluid to the object.

In some forms, the object can be cured when the specified amount of the powder material has been removed.

In some forms, the additive manufacturing technique includes binder jetting or bed fusion.

In some forms, forming the object includes: depositing a first layer of the powder material on a building platform; applying a binding agent to the first layer of the powder material; depositing a second layer of the powder material on the first layer; applying the binding agent to the second layer of the powder material; and repeating the depositing and applying steps until the object has been formed.

BRIEF DESCRIPTION OF THE DRAWINGS

Examples of the invention will now be described with reference to the accompanying drawings, in which.

DETAILED DESCRIPTION

The present disclosure is generally directed to a method of depowdering objects that are additively manufactured using an additive manufacturing technique performed with one or more powder materials (i.e., a powder-based additive manufacturing technique). The depowdering method disclosed herein overcomes the disadvantages and problems discussed above and other disadvantages and problems typically associated with the depowdering process in known powder-based additive manufacturing techniques. More particularly, the depowdering method disclosed herein facilitates a more-effective removal of powder material that is not bound to an object when that object is printed. This is particularly true when the printed object is small, has a complex shape, and/or has an internal geometry of small and/or complex features (e.g., passages or channels with turns, passages or channels with swirls, long flow paths) that is otherwise difficult or impossible to access, or combinations thereof. In those cases, the depowdering method disclosed herein effectively removes unbound powder material that is not only on one or more exterior surfaces of the object but is in one or more interior surfaces of the object (e.g., one or more internal passages) that would otherwise be difficult or impossible to access. It will be appreciated herein that as used herein, the term "unbound powder material" refers to both powder material that is not bound to the printed object (during, for example, a binder jetting process) and powder material that is not fused (i.e., unfused powder material) to the printed object (during, for example, a bed fusion process).

Figure 1:
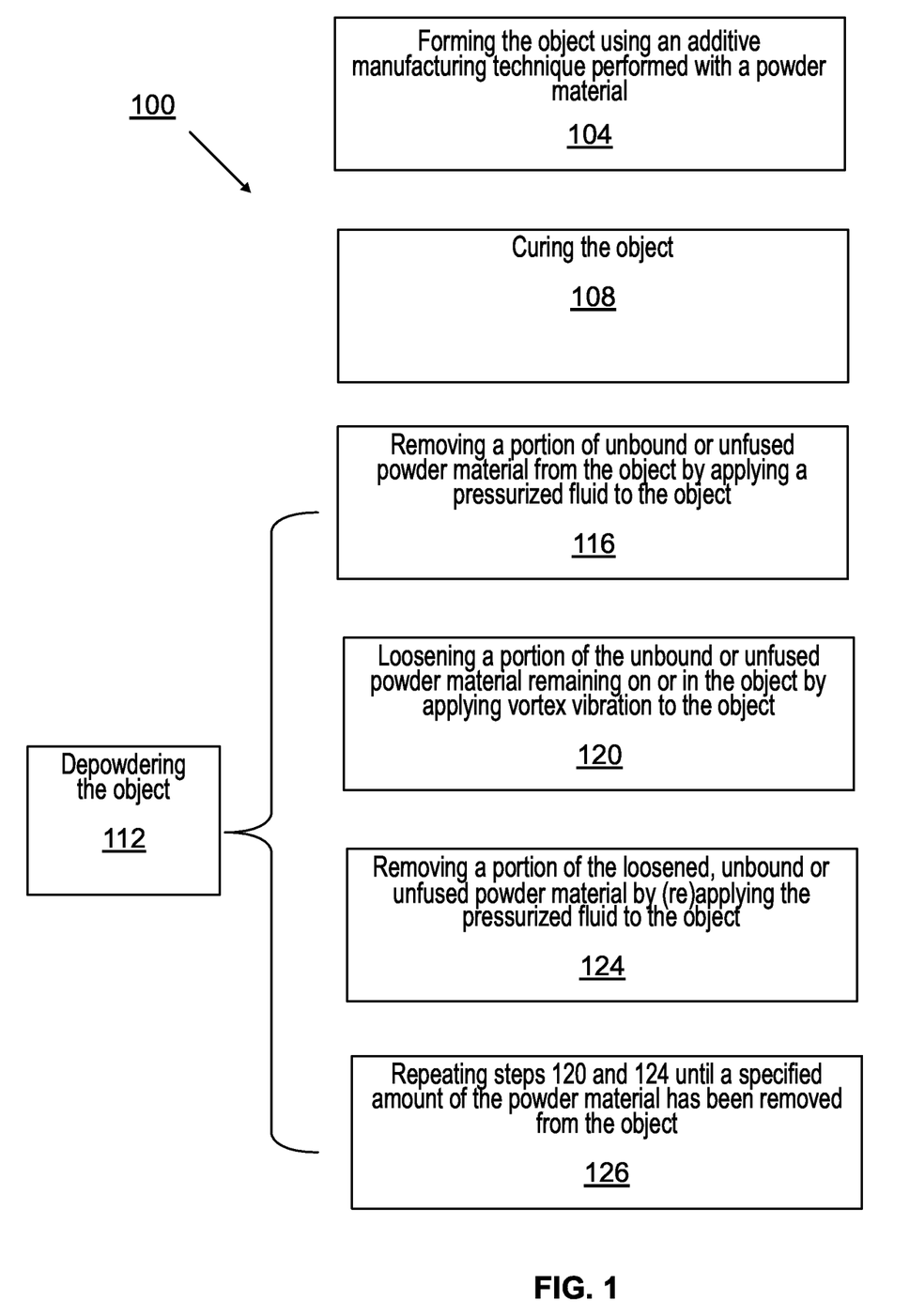
FIG. 1 is a flow chart depicting an example method of additively manufacturing an object in accordance with the teachings of the present disclosure.

FIG. 1 is a diagram of an example of a method or process 100 of additively manufacturing a three-dimensional object in accordance with the teachings of the present disclosure. The method 100 illustrated in FIG. 1 is discussed in the context of custom manufacturing a heat exchanger having a small and/or complex internal geometry, such as the heat exchanger 200 illustrated in FIGS. 2A-2D, which has a plurality of small and non-linear internal passages 204, has a width of 110 mm, a length of 55.5 mm, and a height of 38.5 mm. It will, however, be appreciated that the method 100 can instead be used to custom manufacture other heat exchangers, e.g., any of the heat exchangers disclosed in U.S. patent application Ser. No. 16/810,428, filed Mar. 5, 2020, which is hereby incorporated by reference in its entirety, or other objects (e.g., process control equipment, transportation parts, parts and devices for consumer products, manufacturing equipment parts, industrial equipment parts, communication equipment and parts, etc.). In any event, the method 100 allows for the creation of an object that would otherwise not be possible without additive manufacturing and/or could not be otherwise manufactured without significant cost.

The method 100 includes forming (e.g., printing) the object (e.g., the heat exchanger 200) using an additive manufacturing technique performed with one or more powder materials (i.e., a powder-based additive manufacturing technique) (step 104). Thus, the additive manufacturing technique involves building the object by adding successive layers of the one or more powder materials on a building platform. The additive manufacturing technique may be performed by any suitable machine or combination of machines. The additive manufacturing technique may, for example, be performed by a computer, three-dimensional modeling software (e.g., Computer Aided Design ("CAD") software), other machine equipment, or combinations thereof. Once a CAD model of the object to be formed is produced or obtained, the machine (or machines) may read in data from the CAD file (of the CAD model) and layer or add successive layers of powder materials in a layer-upon-layer fashion to fabricate the three-dimensional object.

In this example, the additive manufacturing technique takes the form of binder jetting. As briefly discussed above, binder jetting generally involves applying layers of one or more powder materials in conjunction with one or more binder agents until the object is formed or printed. First, the machine (or machines) obtain(s) the CAD file of the object. Second, the machine applies and distributes (e.g., evenly spreads) a first layer of a powder material on the building platform. Once the first layer is applied and distributed, the machine utilizes the CAD model to determine where a carriage having a plurality of inkjets should create the printing area by selectively applying a binding agent to the first layer of the powder material, thereby binding at least some of the particles in the layer of the powder material together via the binding agent, and the material area, where the carriage does not apply a binding agent, thereby leaving the layer of powder material loose or unbound, such that each particle in the material area is separate from every other particle. In determining where the carriage should create the printing area, the machine determines (using the CAD model) whether the current layer requires any voids (e.g., channels, passages) to be created within the printed object. After the carriage selectively applies the binding agent, creating the printing area for the first layer, the machine lowers the building platform by a distance substantially equal to or greater than a width of the layer of powder needed to be applied. Once lowered, the machine applies another layer of the powder material to the building platform. The carriage again selectively applies the binding agent to the additional layer of the powder material and creates a printing area for the additional layer of the powder material. Then the machine determines whether an additional layer of the powder material is needed. If an additional layer of the powder material is needed, the process begins again by lowering the building plate and then applying another layer of the powder material. This process is repeated until successive layers have built or printed the entire object.

It will be appreciated that the powder material used by the binder jetting technique (or other additive manufacturing technique) can be one or more suitable materials, such as, for example, ceramics, metal (e.g., stainless steel, aluminum), sand, various alloys, or other materials. It will also be appreciated that in other examples, the additive manufacturing technique may instead or also take the form of powder bed fusion (e.g., laser metal fusion, selective laser sintering, selective laser melting), another suitable powder-based technique, or combinations thereof.

After the object is formed using the additive manufacturing technique, the method 100 includes subjecting the object to a curing process (step 108), wherein the printed part is heated to a specific temperature (usually around 200 degrees Celsius), thereby thermally activating and solidifying the binder agent within the layers. Then, the method 100 includes depowdering the object (step 112) to remove a specified amount of powder material that is not fused or bound to the object during the step of forming the object (i.e., residual powder material). When, for example, the object is the heat exchanger 200 illustrated in FIGS. 2A-2D, the method 100 includes depowdering the heat exchanger 200 to remove a specified amount of powder material that is not fused or bound to the heat exchanger 200 during the step of forming the heat exchanger 200 and remains on or in the heat exchanger 200 after the heat exchanger 200 has been formed and cured. In any event, depowdering the object generally includes a number of steps, with the exact number of steps being dependent upon one or more parameters of the object, e.g., the shape, the size, the surface roughness, the internal geometry, and the layers of the object. More particularly, depowdering the object generally includes applying a pressurized fluid to the object via a pressurized fluid applicator 110 operatively coupled to the object (step 116), applying vortex vibration (e.g., eccentric twisting) to the object via a vortex vibration source 114 operatively coupled to the object (step 120), again applying the pressurized fluid to the object (step 124), and repeating steps 112 and 116 until a specified amount of unbound powder material has been removed (step(s) 126).

Figure 2A:
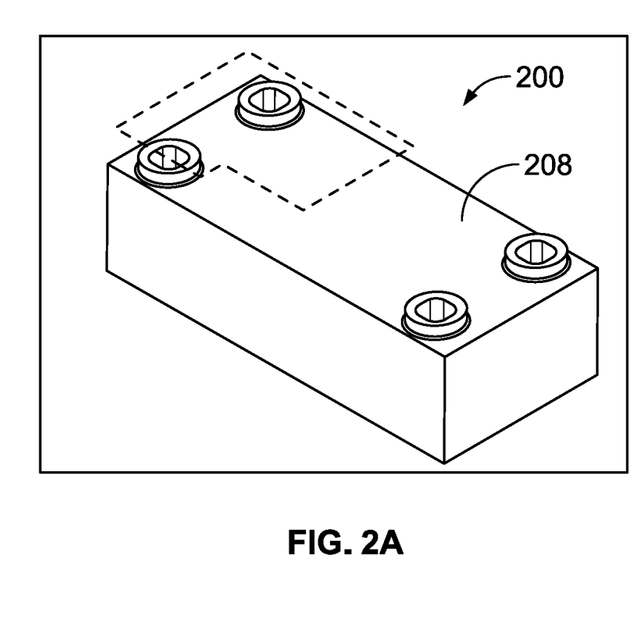
FIG. 2A is a perspective view of an example of an object manufactured by the example method of FIG. 1.
Figure 2B:
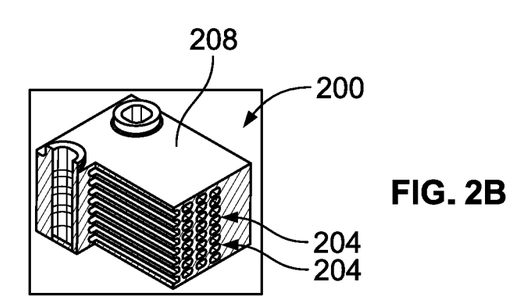
FIG. 2B is a cross-sectional view of a portion of FIG. 2A.
Figures 2C, 2D:
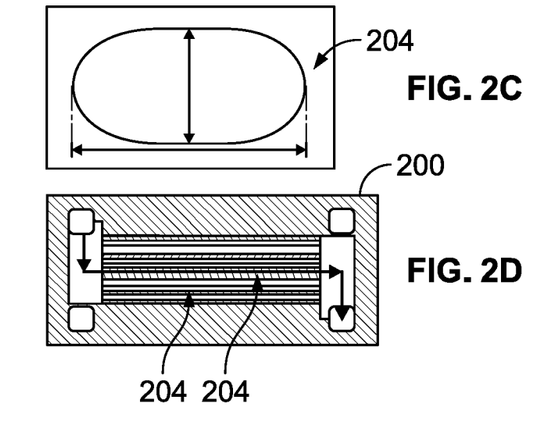
FIG. 2C is a close-up view of a portion of FIG. 2B.
FIG. 2D is a cross-sectional view of a portion of FIG. 2A.
Figure 3A:
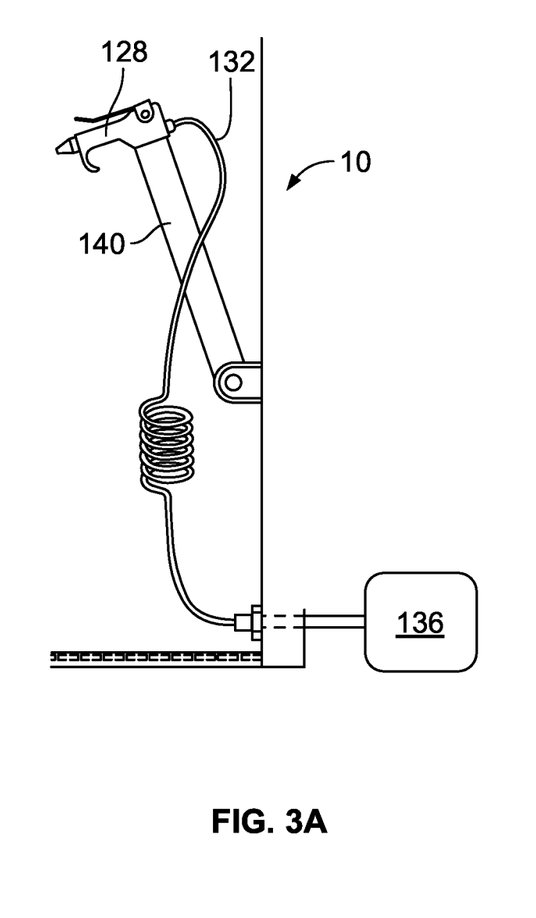
FIG. 3A illustrates an example of a pressurized fluid applicator that can be used to perform the example method of FIG. 1.

At step 116, the application of the pressurized fluid to the object via the pressurized fluid applicator 110 generally serves to remove a portion of the unbound powder material remaining on or in the object (e.g., the heat exchanger 200). As illustrated in FIG. 3A, the pressurized fluid applicator 110 in this example takes the form of a pressurized fluid nozzle 128 and a pressurized fluid conduit 132 connected to the fluid nozzle 128 and to a pressurized fluid source 136. The pressurized fluid nozzle 128 in this example is carried by a robotic arm 140 that is automatically or manually articulable relative to the object when the object is operably coupled to the pressurized fluid applicator 110. The object may, for example, be operably coupled to the pressurized fluid applicator 110 by disposing the object in a frame that houses or carries the pressurized fluid applicator 110 or in some other manner that positions the object proximate the pressurized fluid applicator 110. The pressurized fluid source 136 in this example takes the form of a source of compressed air, though in other examples the pressurized fluid source 136 can instead take the form of a source of compressed nitrogen, water, or any other fluid suitable for removing material. In turn, in this example, the pressurized fluid applicator 110 is configured to apply compressed air from the pressurized fluid source 136 to the object, or portions thereof, for a pre-determined period of time (e.g., 1 minute, 5 minutes, 10 minutes, etc.). When, for example, the object takes the form of the heat exchanger 200, and the heat exchanger 200 is operatively coupled to the pressurized fluid applicator 110, the pressurized fluid applicator 110 is configured to apply compressed air from the pressurized fluid source 136 to an exterior surface 208 of the heat exchanger 200 and to and through the internal passages 204. The application of the compressed air creates turbulent flow near the exterior surface 208 and through the internal passages 204. The turbulent flow serves to remove a majority, if not substantially all, of the unbound or unfused powder from the exterior surface 208, but only removes a small portion of the unbound powder from the internal passages 204, due to the small size and complexity of the internal passages 204.

Figure 3B:
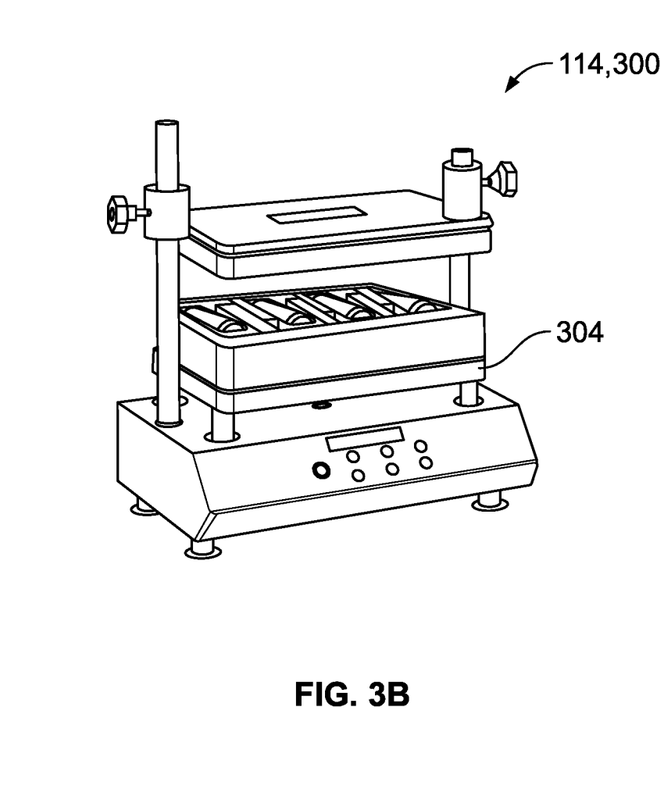
FIG. 3B illustrates an example of a vortex vibration source that can be used to perform the example method of FIG. 1.

At step 120, the application of the vortex vibration to the object via the vortex vibration source 114 generally serves to loosen a portion of the unbound powder material remaining on or in the object after the pressurized fluid has been applied (i.e., after step 116). As illustrated in FIG. 3B, the vortex vibration source 114 in this example takes the form of a heavy-duty vortex mixer 300, such as the Benchmixer Vortexer manufactured by Benchmark Scientific, configured to apply vortex vibration without applying or otherwise utilizing any fluid. The heavy-duty vortex mixer 300 in this example has a shelf 304 for receiving the object (and operably coupling the object to the vortex mixer 300), though it will be appreciated that the object can be operatively coupled to the mixer 300 in a different manner. In any event, when the object is operably coupled to the heavy-duty vortex mixer 300, the heavy-duty vortex mixer 300 is configured to apply eccentric rotation and twisting motion at vortex speeds (e.g., speeds up to 2500 rpm, depending upon the parameters of the object) for a pre-determined period of time (e.g., 5-10 minutes, depending upon the parameters of the object). When, for example, the object takes the form of the heat exchanger 200, and the heat exchanger 200 is operatively coupled to the heavy-duty vortex mixer 300, the heavy-duty vortex mixer 300 is configured to apply to the heat exchanger 200 the eccentric rotation and twisting motion at vortex speeds for the pre-determined period of time. The centripetal forces created by the application of these combined motions serve to loosen at least a portion of the unbound powder material remaining on or in the heat exchanger 200, particularly at least a portion of the unbound powder remaining in the complex internal passages 204.

At step 124, the application of the pressurized fluid to the object via the pressurized fluid applicator 110 generally serves to remove a portion of the unbound powder loosened by the application of the vortex vibration to the object. In this example, the same pressurized fluid will be applied to the object as applied to the object in step 112. In other examples, a different pressurized fluid may be applied to the object. In some cases, the application of the pressurized fluid to the object will serve to remove all or substantially all of the unbound powder loosened by the application of the vortex vibration to the object. In other cases, the application of the pressurized fluid to the object will only serve to remove a portion of the unbound powder loosened by the application of the vortex vibration to the object.

Steps 120 and 124 are repeated until a specified amount of the unbound powder material has been removed from the object. In other words, the object is repeatedly and alternately subjected to the vortex vibration (via the vortex vibration source 114) and to the pressurized fluid (via the pressurized fluid applicator 110) until the specified amount of the unbound powder material has been removed. When, for example, the object takes the form of the heat exchanger 200, and the heat exchanger 200 is operatively coupled to the pressurized fluid applicator 110 and the vortex vibration source 114, the heat exchanger 200 is repeatedly and alternately subject to the vortex vibration and to the pressurized fluid until the specified amount of the unbound powder material has been removed from the heat exchanger 200.

In some cases, the specified amount will be all or substantially all (e.g., 95%, 96%, 97%, 98%, 99%) of the unbound powder material. In other cases, the specified amount will be a majority or some other pre-determined percentage (25%, 30%, 40%, 60%, 70%, 80%) of the unbound powder material. The specified amount may be determined by comparing the unbound powder material remaining on or in the object after steps 120 and 1240 have been repeated a number of times to the unbound powder material on or in the object after step 104 (or step 108), by monitoring the weight reduction of the object due to the removal of the unbound powder material, by determining when the object reaches a pre-determined weight corresponding to when the specified amount has been removed from the object, and/or in some other manner.

The number of times steps 120 and 124 are repeated until the specified amount has been removed will of course depend on the specified amount to be removed but also based on the parameters of the object, including but not limited to the shape, the size, the surface roughness, the internal geometry, and the layers of the object (e.g., the heat exchanger 200), one or more parameters of the pressurized fluid applicator 110 (e.g., the size of the nozzle 128, the speed and/or the volume of the applied pressurized fluid), one or more parameters of the vortex vibration source 114 (e.g., the vortex speed). In some cases, steps 120 and 124 may be repeated 10 times, 25 times, 50 times, or some other number of times before the specified amount has been removed. In one experiment conducted by the Applicant using the heat exchanger 200, the heat exchanger 200 formed by step 104 weighed 447.6 g and the Applicant discovered it was necessary to repeat steps 120 and 124 forty-two times in order to remove the specified amount (all, in that experiment) of the residual powder material (101.1 g of powder material removed in that experiment) from the heat exchanger 200 (leaving a final weight of 345.7 g following the 42 cycles). Conversely, in another experiment conducted by the Applicant using the heat exchanger 200 but utilizing a conventional depowdering process involving only linear vibration (as opposed to the vortex vibration utilized in the depowdering process disclosed herein), the linear vibration only removed approximately 60% of the 101.1 g of powder material removed using the depowdering process disclosed herein. It will thus be appreciated that the depowdering process disclosed herein is far more effective at dislodging and removing unbound powder material from objects that have a small and complex internal geometry, e.g., the heat exchanger 200.

Once the specified amount of the residual powder material has been removed from the object (e.g., the heat exchanger 200), the method 100 further includes performing the rest of the post-processing steps necessary to form the final object. More particularly, the method 100 further includes, for example, a debinding process, which decomposes and removes the binder agent, and a sintering process, thereby forming the final object. The method 100 may further include additional and/or different post-processing steps.

The following list of aspects reflects a variety of the embodiments explicitly contemplated by the present application. Those of ordinary skill in the art will readily appreciate that the aspects below are neither limiting of the embodiments disclosed herein, nor exhaustive of all the embodiments conceivable from the disclosure above, but are instead meant to be exemplary in nature.

1. A method of depowdering an object manufactured using an additive manufacturing technique performed with a powder material, the method comprising: (a) applying a pressurized fluid to the object via a pressurized fluid applicator operatively coupled to the object, thereby removing a portion of unbound powder material on or in the object; (b) applying vortex vibration to the object via a vortex vibration source operatively coupled to the object, thereby loosening a portion of the unbound powder material remaining on or in the object; (c) applying the pressurized fluid to the object via the pressurized fluid application, thereby removing a portion of the loosened, unbound powder material from the object; and (d) repeating steps (b) and (c) until a specified amount of the unbound powder material has been removed from the object.

2. The method of aspect 1, wherein the specified amount comprises substantially all or all of the unbound powder material.

3. The method of aspect 1 or 2, wherein the object comprises one or more internal passages, and wherein step (b) loosens a portion of the unbound powder material in the one or more internal passages.

4. The method of any one of aspects 1 to 3, wherein steps (b) and (c) are repeated a number of times based on one or more parameters of the object.

5. The method of aspect 4, wherein steps (b) and (c) are repeated at least 25 times.

6. The method of aspect 4 or 5, wherein the one or more parameters comprise one or more of a shape, a size, a surface roughness, an internal geometry, and layers of the object.

7. The method of aspect 1, wherein step (b) comprises applying the vortex vibration at a vortex speed for a period of time, and wherein the vortex speed and the period of time depend on one or more parameters of the object.

8. The method of any one of aspects 1 to 7, wherein step (b) is performed without applying any fluid to the object.

9. A method of depowdering an object manufactured using additive manufacturing performed with a powder material, the method comprising: (a) removing a portion of unbound powder material from the object by applying a pressurized fluid to the object via the pressurized fluid applicator operatively coupled to the object; (b) loosening a portion of the unbound powder material remaining on or in the object by applying vortex vibration to the object via a vortex vibration source operatively coupled to the object; (c) removing a portion of the loosened, unbound powder material by applying the pressurized fluid to the object via the pressurized fluid applicator; and (d) repeating steps (b) and (c) until a specified amount of the unbound powder material has been removed from the object.

10. The method of aspect 9, wherein the specified amount comprises substantially all or all of the unbound powder material.

11. The method of aspect 9 or 10, wherein the object comprises one or more internal passages, and wherein step (b) loosens a portion of the unbound powder material in the one or more internal passages.

12. The method of any one of aspects 9 to 11, wherein steps (b) and (c) are repeated a number of times based on one or more parameters of the object.

13. The method of any one of aspects 9 to 12, wherein steps (b) and (c) are repeated at least 25 times.

14. The method of any one of aspects 9 to 13, wherein the one or more parameters comprise one or more of a shape, a size, a surface roughness, an internal geometry, and layers of the object.
15. The method of any one of aspects 9 to 14, wherein step (b) comprises applying the vortex vibration at a vortex speed for a period of time, and wherein the vortex speed and the period of time depend on one or more parameters of the object.
16. The method of any one of aspects 9 to 15, wherein step (b) is performed without applying any fluid to the object.
17. A method of additively manufacturing an object, the method comprising: (a) forming the object using an additive manufacturing technique performed with a powder material; (b) removing a portion of unbound powder material from the object by applying a pressurized fluid to the object via a pressurized fluid applicator operatively coupled to the object; (c) loosening a portion of the unbound powder material remaining on or in the object by applying vortex vibration to the object via a vortex vibration source operatively coupled to the object; (d) removing a portion of the loosened, unbound powder material by applying the pressurized fluid to the object via the pressurized fluid applicator; and (e) repeating steps (c) and (d) until a specified amount of the powder material has been removed from the object.
18. The method of aspect 17, further comprising curing the object when the specified amount of the powder material has been removed.
19. The method of aspect 17 or 18, wherein the additive manufacturing technique comprises binder jetting.
20. The method of aspect 19, wherein (a) comprises: depositing a first layer of the powder material on a building platform; applying a binding agent to the first layer of the powder material; depositing a second layer of the powder material on the first layer; applying the binding agent to the second layer of the powder material; and repeating the depositing and applying steps until the object has been formed.

The invention claimed is:

1. A method of depowdering an object manufactured using an additive manufacturing technique performed with a powder material, the method comprising:
   (a) applying a pressurized fluid to the object via a pressurized fluid applicator operatively coupled to the object, thereby removing a portion of unbound powder material on or in the object;
   (b) applying vortex vibration to the object via a vortex vibration source operatively coupled to the object, thereby loosening a portion of the unbound powder material remaining on or in the object;
   (c) applying the pressurized fluid to the object via the pressurized fluid application, thereby removing a portion of the loosened, unbound powder material from the object;
   (d) repeating steps (b) and (c) until a specified amount of the unbound powder material has been removed from the object; and
   (e) determining whether the specified amount of the unbound power material has been removed from the object by comparing a weight of the object before step (a) and the weight of the object after step (b),
   wherein the object comprises one or more internal passages, wherein step (b) loosens a portion of the unbound powder material remaining in the one or more internal passages, wherein the vortex vibration source is a vortex mixer having a shelf configured to receive and retain the object, and wherein step (b) comprises positioning the object on the shelf of the vortex mixer.

2. The method of claim 1, wherein the specified amount comprises substantially all or all of the unbound powder material.

3. The method of claim 1, wherein each of the one or more internal passages has an internal diameter equal to between approximately 1 mm and approximately 20 mm.

4. The method of claim 1, wherein steps (b) and (c) are repeated a number of times based on one or more parameters of the object.

5. The method of claim 4, wherein the one or more parameters comprise one or more of a shape, a size, a surface roughness, an internal geometry, and layers of the object.

6. The method of claim 1, wherein step (b) comprises applying the vortex vibration at a vortex speed for a period of time, and wherein the vortex speed and the period of time depend on one or more parameters of the object.

7. The method of claim 1, wherein step (b) is performed without applying any fluid to the object.

8. The method of claim 1, wherein the pressurized fluid applicator comprises:
   a single pressurized fluid nozzle configured to directly apply the pressurized fluid to the object;
   a pressurized fluid source; and
   a pressurized fluid conduit connected to the single pressurized fluid nozzle and to the pressurized fluid source, the pressurized fluid conduit configured to provide the pressurized fluid from the pressurized fluid source to the single pressurized fluid nozzle.

9. The method of claim 8, further comprising a robotic arm coupled to the single pressurized fluid nozzle, the robotic arm configured to freely articulate the single pressurized fluid nozzle relative to the object.

10. A method of depowdering an object manufactured using additive manufacturing performed with a powder material, the method comprising:
    (a) removing a portion of unbound powder material from the object by applying a pressurized fluid to the object via the pressurized fluid applicator operatively coupled to the object;
    (b) loosening a portion of the unbound powder material remaining on or in the object by applying vortex vibration to the object via a vortex vibration source operatively coupled to the object;
    (c) removing a portion of the loosened, unbound powder material by applying the pressurized fluid to the object via the pressurized fluid applicator; and
    (d) repeating steps (b) and (c) until a specified amount of the unbound powder material has been removed from the object,
    wherein the object comprises one or more internal passages each having an internal diameter equal to between approximately 1 mm and 20 mm, wherein step (b) loosens a portion of the unbound powder material remaining in the one or more internal passages, and wherein the pressurized fluid applicator consists of a single pressurized fluid nozzle configured to directly apply the pressurized fluid to the object.

11. The method of claim 10, wherein the specified amount comprises substantially all or all of the unbound powder material.

12. The method of claim 10, wherein steps (b) and (c) are repeated a number of times based on one or more parameters of the object.

13. The method of claim 12, wherein the one or more parameters comprise one or more of a shape, a size, a surface roughness, an internal geometry, and layers of the object.

14. The method of claim 10, wherein step (b) comprises applying the vortex vibration at a vortex speed for a period of time, and wherein the vortex speed and the period of time depend on one or more parameters of the object.

15. The method of claim 10, wherein step (b) is performed without applying any fluid to the object.

16. The method of claim 10, further comprising determining whether the specified amount of the unbound powder material has been removed from the object by comparing a weight of the object before step (a) and after step (b).

17. The method of claim 10, further comprising determining that the specified amount of the unbound powder material has been removed when the object reaches a pre-determined weight corresponding to removal of the specified amount of the unbound powder material.

18. A method of additively manufacturing a heat exchanger, the method comprising:
   (a) forming the heat exchanger using an additive manufacturing technique performed with a powder material;
   (b) removing a portion of unbound powder material from the heat exchanger by applying a pressurized fluid to the heat exchanger via a pressurized fluid applicator operatively coupled to the heat exchanger;
   (c) loosening a portion of the unbound powder material remaining on or in the heat exchanger by applying vortex vibration to the heat exchanger via a vortex vibration source operatively coupled to the heat exchanger;
   (d) removing a portion of the loosened, unbound powder material by applying the pressurized fluid to the heat exchanger via the pressurized fluid applicator; and
   (e) repeating steps (c) and (d) until a specified amount of the powder material has been removed from the heat exchanger,
   wherein the heat exchanger comprises one or more internal passages, and wherein step (c) loosens a portion of the unbound powder material remaining in the one or more internal passages.

19. The method of claim 18, further comprising curing the heat exchanger when the specified amount of the powder material has been removed.

20. The method of claim 18, wherein the additive manufacturing technique comprises binder jetting.

21. The method of claim 20, wherein (a) comprises:
   depositing a first layer of the powder material on a building platform;
   applying a binding agent to the first layer of the powder material;
   depositing a second layer of the powder material on the first layer;
   applying the binding agent to the second layer of the powder material; and
   repeating the depositing and applying steps until the heat exchanger has been formed.

* * * * *

UNITED STATES PATENT AND TRADEMARK OFFICE
CERTIFICATE OF CORRECTION

PATENT NO. : 12,208,573 B2
APPLICATION NO. : 17/107726
DATED : January 28, 2025
INVENTOR(S) : Wenhua Yu et al.

Page 1 of 1

It is certified that error appears in the above-identified patent and that said Letters Patent is hereby corrected as shown below:

In the Claims

At Column 9, Line 62, "power" should be -- powder --.

Signed and Sealed this
Sixteenth Day of December, 2025

John A. Squires
*Director of the United States Patent and Trademark Office*